(12) United States Patent
Mori et al.

(10) Patent No.: US 7,368,168 B2
(45) Date of Patent: May 6, 2008

(54) LOW-FRICTION SLIDING MEMBER

(75) Inventors: Hiroyuki Mori, Nisshin (JP); Fumio Shimizu, Toyota (JP); Hideo Tachikawa, Nisshin (JP); Toshihide Ohmori, Nagoya (JP); Hiroshi Moritani, Seto (JP); Mamoru Tohyama, Nagoya (JP); Yoshio Shimura, Aichi-gun (JP); Shigeru Hotta, Ama-gun (JP); Takashi Iseki, Nisshin (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 11/115,192

(22) Filed: Apr. 27, 2005

(65) Prior Publication Data
US 2005/0238877 A1  Oct. 27, 2005

(30) Foreign Application Priority Data
Apr. 27, 2004  (JP)  ............................ 2004-130764
Jan. 26, 2005  (JP)  ............................ 2005-018209

(51) Int. Cl.
*C23C 16/26*  (2006.01)
(52) U.S. Cl. .................. 428/408; 428/156; 428/174; 428/446
(58) Field of Classification Search ................ 428/446, 428/408, 698, 156, 174
See application file for complete search history.

(56) References Cited

U.S. PATENT DOCUMENTS

| | | | | |
|---|---|---|---|---|
| 5,198,285 A | * | 3/1993 | Arai et al. ................... | 428/408 |
| 5,266,398 A | * | 11/1993 | Hioki et al. ................. | 428/688 |
| 5,771,873 A | * | 6/1998 | Potter et al. ................. | 123/668 |
| 6,139,022 A | * | 10/2000 | Iwashita et al. ............. | 277/443 |
| 6,740,393 B1 | * | 5/2004 | Massler et al. ............. | 428/408 |
| 6,806,242 B2 | * | 10/2004 | Shirahama et al. ......... | 123/1 A |
| 6,844,068 B1 | * | 1/2005 | Miyake et al. .............. | 428/408 |

(Continued)

FOREIGN PATENT DOCUMENTS

JP  03-240957  10/1991

(Continued)

OTHER PUBLICATIONS

U.S. Appl. No. 10/488,290, filed Mar. 2, 2004, Mori et al.

(Continued)

*Primary Examiner*—Archene Turner
(74) *Attorney, Agent, or Firm*—Oblon, Spivak, McClelland, Maier & Neustadt, P.C.

(57) ABSTRACT

A low-friction sliding member is used under a wet condition employing a lubricant, and includes a substrate having a surface, and an amorphous hard carbon film formed on the surface of the substrate for contacting slidably with a mating member. The amorphous hard carbon film includes silicon in an amount of from 1 atomic % or more to 20 atomic % or less, hydrogen in an amount of from 20 atomic % or more to 50 atomic % or less, and the balance of carbon and inevitable impurities, when the entirety is taken as 100 atomic %, and exhibits a surface roughness $Rz_{jis}$ of 0.8 μm or less. The low-friction sliding member exhibits reduced friction coefficients between itself and mating members, without relying on the adsorption and reaction of additives, included in lubricants, to the amorphous hard carbon films.

9 Claims, 6 Drawing Sheets

U.S. PATENT DOCUMENTS 6,969,198 B2 * 11/2005 Konishi et al. .............. 384/13
2004/0234770 A1   11/2004 Mori et al.

FOREIGN PATENT DOCUMENTS

| | | | |
|---|---|---|---|
| JP | 2001-192864 | | 7/2001 |
| JP | 2001-214269 | * | 8/2001 |
| JP | 2003-014122 | * | 1/2003 |
| JP | 2003-027214 | * | 1/2003 |
| JP | 2003-247060 | * | 9/2003 |
| JP | 2003-293136 | * | 10/2003 |
| JP | 2003-336542 | * | 11/2003 |
| JP | 2004-155891 | | 6/2004 |
| WO | WO 03/029685 A1 | | 4/2003 |

OTHER PUBLICATIONS

U.S. Appl. No. 11/115,192, filed Apr. 27, 2005, Mori et al.
U.S. Appl. No. 11/002,125, filed Dec. 3, 2004, Nakanishi et al.

* cited by examiner

LOW-FRICTION SLIDING MEMBER

BACKGROUND OF THE INVENTION

1. Field of the Invention

The present invention relates to a low-friction sliding member, which is used under a wet condition employing a lubricant, which exhibits low friction coefficient between itself and mating members, and which is good in terms of the wear resistance.

2. Description of the Related Art

It is required for sliding members, such as pistons and valve-system component parts making engines, to reduce energy loss resulting from friction as much as possible in view of resource conservation and environmental protection. Accordingly, the sliding surfaces of sliding members have been subjected to various surface treatments conventionally in order to reduce the friction coefficient between sliding members and mating members, and to improve wear resistance. In particular, amorphous hard carbon films called diamond-like carbon (hereinafter abbreviated to as "DLC") films have been utilized widely as films which enhance the slidablity of sliding surfaces.

For example, Japanese Unexamined Patent Publication (KOKAI) No. 3-240,957 discloses an amorphous hard carbon film which includes silicon (Si). This conventional amorphous hard carbon film exhibits low friction coefficient between itself and mating members under a dry condition employing no lubricant. However, it is difficult for the conventional amorphous hard carbon film to reduce friction coefficient under a wet condition employing a lubricant. One of the causes of the disadvantage is believed to be the influence of a variety of additives included in lubricants. Additives included in lubricants adsorb onto amorphous hard carbon films' surface and react therewith to form boundary films. Hence, it is believed that boundary films, which are formed in sliding operations, determine actual friction coefficients. In particular, when oils for driving systems, oils which are intended for coping with high friction for power transmission, are used as lubricants, it is difficult to reduce actual friction coefficient in sliding operations.

On the other hand, Japanese Unexamined Patent Publication (KOKAI) No. 2001-192,864 discloses an attempt to use a lubricant which contains an aromatic compound. Aromatic compounds form firm boundary films on the surfaces of amorphous hard carbon films, because they exhibit high adsorption forces to amorphous hard carbon films. That is, in this conventional attempt, a firm boundary film is formed on the surfaces of amorphous hard carbon films in order to diminish the proportion of solid contact and eventually reduce actual friction coefficients in sliding operations. However, when an aromatic compound, an additive, is changed to another additives other than aromatic compounds, the another additives adsorb onto and react with amorphous hard carbon films so that the conventional attempt might suffer from hindered reduction of actual friction coefficients in sliding operations. Moreover, in view of environmental protection, it is believed as well that reviewing the types of usable additives and optimizing their usable amounts would get underway greatly. If such is the case, it is expected that it would be difficult for the conventional attempt, which relies on additives' adsorption and reaction to amorphous hard carbon films, to reduce actual friction coefficients in sliding operations.

SUMMARY OF THE INVENTION

The present invention has been developed in view of the aforementioned circumstances. It is therefore an objet to the present invention to provide a low-friction sliding member which can achieve low friction coefficients between itself and mating members in sliding operations without relying on the adsorption and reaction of additives to amorphous hard carbon films, additives which are included in lubricants.

A low-friction sliding member according to the present invention comprises:

a substrate having a surface; and
an amorphous hard carbon film formed on the surface of the substrate for contacting slidably with a mating member,
  the amorphous hard carbon film comprising:
    silicon in an amount of from 1 atomic % or more to 20 atomic % or less;
    hydrogen in an amount of from 20 atomic % or more to 50 atomic % or less; and
    the balance of carbon and inevitable impurities, when the entirety is taken as 100 atomic %,
  wherein the amorphous hard carbon film exhibits a surface roughness $Rz_{jis}$ of 0.8 μm or less, and the low-friction sliding member is used under a wet condition employing a lubricant.

In the present low-friction sliding member, the amorphous hard carbon film, which contacts slidably with a mating member, exhibits such a low surface roughness $Rz_{jis}$ as 0.8 μm or less. Accordingly, the proportion of boundary friction resulting from solid-solid contact reduces, but the proportion of lubrication resulting from lubricant increases. Consequently, it is possible to reduce friction coefficients between itself and mating members in sliding operations. Moreover, the amorphous hard carbon film of the present low-friction sliding member is harder and less likely to be worn compared with steel materials. Therefore, the amorphous hard carbon film can keep the initial low surface roughness even when it contacts slidably with mating members. Note that the amorphous hard carbon film comprises a predetermined amount of silicon (Si). According to an analysis carried out by the present inventors, it was found that amorphous hard carbon films containing Si generate silanol (i.e., SiOH) on their surfaces when they contact slidably with mating members. The generation of silanol is believed to contribute to the reduction of actual friction coefficients in sliding operations. Thus, the present low-friction sliding member exhibits low friction coefficients between itself and mating members in sliding operations because of both actions, the increased proportion of lubrication resulting from lubricant and the reduced proportion of boundary friction resulting from the generation of silanol.

Specifically, the present low-friction sliding member exhibits reduced friction coefficients between itself and mating members in sliding operations, because the amorphous hard carbon film, which contacts slidably with a mating member, exhibits such a low surface roughness that the proportion of lubrication resulting from lubricant increases. Moreover, the present low-friction sliding member exhibits diminished boundary friction as well, because the amorphous hard carbon film comprises Si. Therefore, the present low-friction sliding member can achieve low actual friction coefficients between itself and mating members in sliding operations without relying on the adsorption and reaction of additives to the amorphous hard carbon film, additives which are included in lubricants.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Hereinafter, a low-friction sliding member according to the present invention will be described in detail. As described above, the present low-friction sliding member is used under a wet condition employing a lubricant. The present low-friction sliding member comprises a substrate having a surface, and an amorphous hard carbon film formed on the surface of the substrate for contacting slidably with a mating member. Moreover, the amorphous hard carbon film comprises silicon in an amount of from 1 atomic % or more to 20 atomic % or less, hydrogen in an amount of from 20 atomic % or more to 50 atomic % or less, andthebalance of carbonand inevitable impurities, when the entirety is taken as 100 atomic %. In addition, the amorphous hard carbon film exhibits a surface roughness $Rz_{jis}$ of 0.8 µm or less.

Materials for the substrate are not limited in particular as far as they can be applied to sliding members. For example, it is possible to use at least one material selected from the group consisting of metal, ceramic and resin. Moreover, it is possible to name metallic substrates, ceramic substrates and resinous substrates. The metallic substrates can be made of carbon steel, alloy steel, cast iron, aluminum alloy and titanium alloy. The ceramic substrates can be made of cemented carbide, alumina and silicon nitride. The resinous substrates can be made of polyimide and polyamide.

The substrate can preferably exhibit a surface roughness $Rz_{jis}$ of 0.8 µm or less. The substrate can further preferably exhibit a surface roughness $Rz_{jis}$ of 0.5 µm or less.

The amorphous hard carbon film comprises carbon (C), hydrogen (H), and silicon (Si). The hydrogen content is from 20 atomic % or more to 50 atomic % or less when the entire amorphous hard carbon film is taken as 100 atomic %. When the hydrogen content is less than 20 atomic %, the resulting amorphous hard carbon films exhibit enlarged hardness, but show lowered adhesion force and toughness. The hydrogen content can further preferably be 25 atomic % or more. On the other hand, when the hydrogen content exceeds 50 atomic %, the resultant amorphous hard carbon films exhibit decreased hardness, and accordingly show lowered abrasion resistance. It is apparent that the hydrogen content can be 35 atomic % or less.

Moreover, the silicon content of the amorphous hard carbon film is from 1 atomic % or more to 20 atomic % or less when the entire amorphous hard carbon film is taken as 100 atomic %. When the silicon content is less than 1 atomic %, the resulting amorphous hard carbon films exhibit the effect of reducing boundary friction less. In order to let the amorphous hard carbon film exhibit further reduced boundary friction, the silicon content can preferably be 5 atomic % or more, further preferably 6 atomic %. In view of yielding a practical film-forming rate, the silicon content can desirably be increased to more than 5 atomic %. On the other hand, when the silicon content exceeds 20 atomic %, the resultant amorphous hard carbon films exhibit increased worn amounts. When taking the abrasion resistance and seizure resistance of the amorphous hard carbon film into consideration, the silicon content can preferably be 9.8 atomic % or less, further preferably 9.5 atomic % or less.

The amorphous hard carbon film exhibits a surface roughness $Rz_{jis}$ of 0.8 µm or less. When the surface roughness $Rz_{jis}$ is of the amorphous hard carbon film surpasses 0.8 µm, the increased proportion of lubrication resulting from lubricant cannot be expected, and accordingly actual friction coefficients in sliding operations cannot be reduced. The amorphous hard carbon film can preferably exhibit a surface roughness $Rz_{jis}$ of 0.5 µm or less. Moreover, there are certain types of lubricants, such as oils for driving systems, oils which are intended for coping with high friction for power transmission. When using such an oil, it is less likely to reduce actual friction coefficients in sliding operations, compared with the cases where engine oils other than such an oil are used. Therefore, when using the present low-friction sliding member under conditions employing lubricants which are intended for coping with high friction for power transmission, it is preferable to further decrease the surface roughness $Rz_{jis}$ of the amorphous hard carbon film. For example, when employing oils for driving systems, the amorphous hard carbon film can preferably exhibit a surface roughness $Rz_{jis}$ is of 0.3 μm or less, further preferably 0.2 μm or less, furthermore preferably 0.15 μm or less, moreover preferably 0.12 μm or less, still further preferably 0.10 μm or less. The smaller the surface roughness is the more desirable it is for the present low-friction sliding member. However, in view of the production cost, it is advisable to set the lower limit of the surface roughness $Rz_{jis}$ of the amorphous hard carbon film at 0.001 μm or more. Note that the method of calculating the surface roughness $Rz_{jis}$, the ten-point-average height, follows the method set forth in Japanese Industrial Standard, JIS B 0601 (1994).

The hardness of the amorphous hard carbon film is not limited in particular. For example, when taking the abrasion resistance of amorphous hard carbon film taking into consideration, the amorphous hard carbon film can preferably exhibit a hardness of 15 GPa or more. In the present specification, as the hardness of amorphous hard carbon film, values measured with a nano-indenter tester "MTS" produced by TOYO TECHNICA Co., Ltd. are employed. Note that the upper limit of the hardness of the amorphous hard carbon film can preferably be 20 GPa or less, further preferably 30 GPa or less. Moreover, the amorphous hard carbon film can preferably have a thickness of 0.1 μm or more, further preferably 0.5 μm or more. Also note that the upper limit of the thickness of the amorphous hard carbon film can preferably be 20 μm or less, further preferably 50 μm or less.

Under sliding conditions where high sliding pressures of 100 MPa or more are exerted, amorphous hard carbon films are likely to come off from substrates. Therefore, in view of inhibiting the amorphous hard carbon from coming off from the substrate, an adhesion force of 10 N or more can preferably be exerted between the substrate and the amorphous hard carbon film. Moreover, when using the present low-friction sliding member under sliding conditions where high sliding pressures of 1,000 MPa or more are exerted, an adhesion force of 20 N or more can preferably be exerted between the substrate and the amorphous hard carbon film. Adhesion forces between substrates and amorphous hard carbon films can be found from come-off loads to amorphous carbon films, come-off loads which an ordinary scratching test yields. In the present invention, films are scratched with a diamond cone whose apex angle is 120 degrees and leading-end radius is 0.2 mm while applying loads to the diamond cone. The loads at which films are come off from substrates are regarded as adhesion forces.

The amorphous hard carbon film can be formed by conventionally known CVD methods or physical vapor deposition (hereinafter abbreviated to as "PVD") methods, such as PCVD methods, ion plating methods and sputtering. For example, when forming the amorphous hard carbon film by a PCVD method, a substrate is disposed in a vacuum chamber, and a reaction gas and a carrier gas are introduced into the vacuum chamber. Then, a plasma is generated by discharging in the vacuum chamber to deposit the plasma-ionized C, CH and Si in the reaction gas onto the substrate, thereby forming an amorphous hard carbon film. As for the reaction gas, it is possible to use a hydrocarbon gas, a silicide gas and a hydrogen gas. The hydrocarbon gas can be methane ($CH_4$), and acetylene ($C_2H_2$). The silicide gas can be tetramethyl silane ($Si(CH_3)_4$, hereinafter abbreviated to as "TMS"), $SiH_4$, $SiCl_4$, and $SiH_2F_4$. As for the carrier gas, it is possible to use an argon gas.

The present low-friction sliding member is used under a wet condition employing a lubricant. As for the lubricant, it is possible to name engine oils, oils for driving systems, fuel oils, and base oils. The oils for driving systems can be ATFs, continuously variable transmission fluids (hereinafter abbreviated to as "CVTF"), and gear oils. The fuel oil can be gasoline, and light oil. The base oils can be vegetable oils, mineral oils, and synthesized oils.

Specifically, when the present low-friction sliding member is used under a wet condition even employing a high-additive-content lubricant or a low-additive-content lubricant, the present low-friction sliding can achieve low actual friction coefficients in sliding operations. The high-additive-content lubricant herein means lubricants comprising at least one member selected from the group consisting of phosphorus, zinc, calcium, magnesium, sodium, barium, copper and chlorine in a summed amount of more than 500 ppm by weight. The low-additive-content lubricant herein means lubricants comprising at least one member selected from the group consisting of phosphorus, zinc, calcium, magnesium, sodium, barium, copper and chlorine in a summed amount of 500 ppm by weight or less. Among high-additive-content lubricants, when employing a high-additive-content lubricant comprising at least one member selected from the group consisting of phosphorus, zinc, calcium, magnesium, sodium, barium, copper and chlorine in a summed amount of more than 500 ppm by weight, and water in an amount of 10 ppm by weight or more to 5% by weight or less, the present low-friction sliding member effects the advantage of remarkably reducing actual friction coefficients in sliding operations. In this instance, the mechanism of reducing actual friction coefficients is believed to be as hereinafter described.

Figure 12:
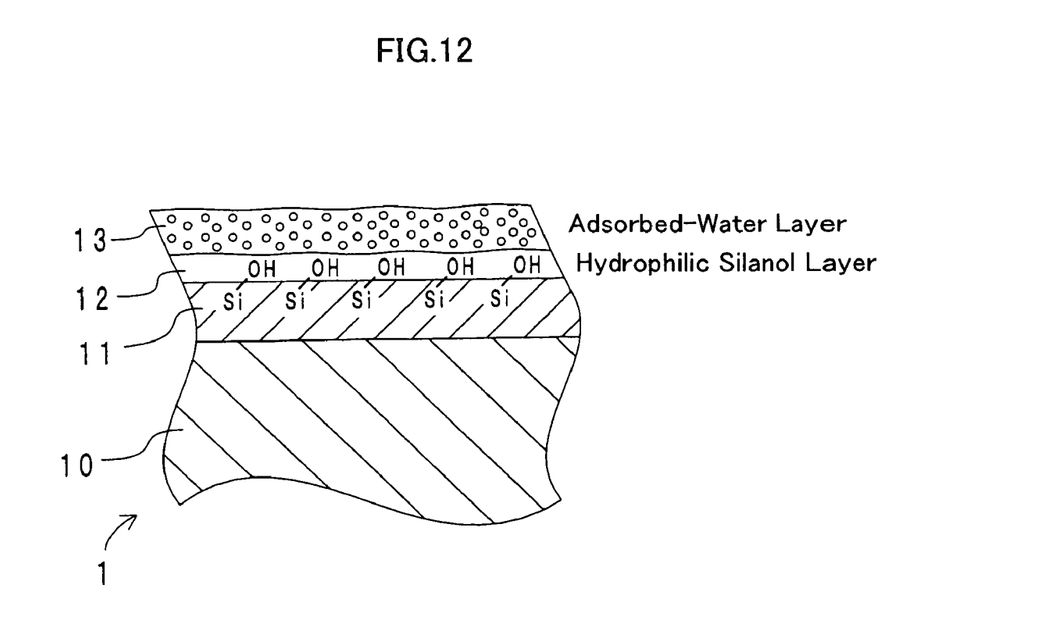
FIG. 12 is a diagram for schematically illustrating a major cross section of the present low-friction sliding member in sliding operations.

FIG. 12 schematically illustrates a major cross section of the present low-friction sliding member in sliding operations. As illustrated in the diagram, a low-friction sliding member 1, the present low-friction sliding member, comprises a substrate 10, and an amorphous hard carbon film 11. The amorphous hard carbon film 11 is formed on a surface of the substrate 10. The sliding of the low-friction sliding member 1 on a mating member generates a silanol layer (i.e., Si—OH layer) 12 on a surface of the amorphous hard carbon film 11. Moreover, an adsorbed-water layer 13 further generates on the silanol layer 12. Water included in a lubricant generates the adsorbed-water layer 13. Note that the presence of the adsorbed-water layer 13 furthermore reduces actual friction coefficients in sliding operations.

For example, engine oils are emulsified when they are mixed with water in an amount of 1% by weight approximately. Emulsified engine oils cause problems, because their additives precipitate or their lubricating abilities lower. Moreover, it is observed that water mixed with lubricants usually causes seizure or increases actual friction coefficients in sliding operations. However, since the present low-friction sliding material comprises the amorphous hard carbon film including silicon in a predetermined amount, water in lubricants generates an adsorbed-water layer on the resulting silanol layer. Thus, the present low-friction sliding member is free from the problems even when lubricants are mixed with water, and rather demonstrates low actual friction coefficients in sliding operations because of the synergistic effect of silanol and water.

When the high-additive-content lubricant further comprises water in an amount of less than 10 ppm by weight, the present low-friction sliding member effects the advantage of reducing actual friction coefficients less. On the other hand, when the high-additive-content lubricant comprises water in an amount of more than 5% by weight, such a high-additive-content lubricant is not preferable because it is emulsified, its additives precipitates or its lubricating ability lowers. Note that, even when the low-additive-content lubricant further comprises water in an amount of less than 10 ppm by weight, the present low-friction sliding member demonstrates the advantageous effect, reducing actual friction coefficients in sliding operations.

The mating member with which the amorphous hard carbon film contacts slidably can preferably comprise at least one member selected from the group consisting of metal, resin and ceramic. The metal can be carbon steel, alloy steel, cast iron, aluminum alloy and titanium alloy. The ceramic can be cemented carbide, alumina and silicon nitride. The resin can be polyimide and polyamide. Moreover, when the mating member likewise comprises an amorphous hard carbon film comprising silicon in an amount of from 1 atomic % or more to 20 atomic % or less, hydrogen in an amount of from 20 atomic % or more to 50 atomic % or less, and the balance of carbon and inevitable impurities, when the entirety is taken as 100 atomic %, and exhibiting a surface roughness $Rz_{jis}$ of 0.8 μm or less, it is preferable because the present low-friction sliding member exhibits much more reduced actual friction coefficients in sliding operations.

So far, the present low-friction sliding member is described with reference to its embodiment modes. However, the present low-friction sliding member is not limited to the above-described specific embodiment modes. It will be possible for one of ordinary skill in the art to carry out the present low-friction sliding member in various modes provided with such changes and modifications that he or she can think of within such a range that hardly departs from the spirit or scope of the present invention.

EXPERIMENTAL EXAMPLES

Based on the above-described specific embodiment modes, various amorphous hard carbon films were formed on surfaces of various substrates. Then, the resulting low-friction sliding members were subjected to two types of sliding tests, which employed different lubricants, in order to evaluate the friction characteristics of the respective amorphous hard carbon films. The present low-friction sliding member will be hereinafter described with reference to the sliding tests and the evaluation on the friction characteristics.

(1) Sliding Test Under Engine Oil

(a) Formation of Silicon-Containing Amorphous Hard Carbon Film

Figure 1:
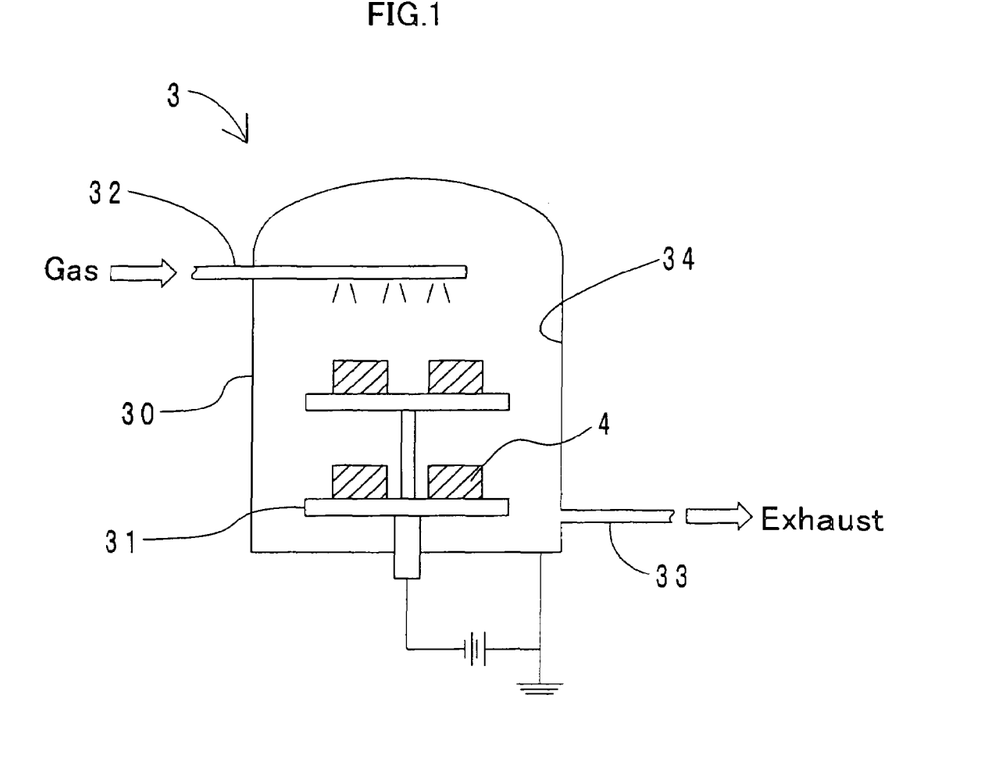
FIG. 1 is a diagram for roughly illustrating an apparatus for forming a film by plasma chemical vapor deposition (hereinafter abbreviated to as "PCVD").

A silicon-containing amorphous hard carbon film (hereinafter abbreviated to as "DLC—Si" Film wherever appropriate) was formed on a substrate using a PCVD film-forming apparatus as illustrated in FIG. 1. As shown in the drawing, a PCVD film-forming apparatus 3 comprises a stainless-steel chamber 30, a base 31, a gas inlet pipe 32, and a gas outlet pipe 33. The gas inlet pipe 32 is connected with various gas bombs (not shown) by way of valves (not shown). The gas outlet pipe 33 is connected with a rotary pump (not shown) and a diffusion pump (not shown) by way of valves (not shown).

First, substrates 4 were disposed on the base 31 which was placed in the chamber 30. The substrates 4 were block-shaped test pieces which were made of martensitic stainless steel, SUS440C as per JIS. Note that the block-shaped test pieces had a thickness of 6.3 mm, a length of 15.7 mm and a width of 10.1 mm. Also note that that SUS440C was subjected to quenching and tempering and exhibited a Rockwell hardness of 58 $H_RC$. Subsequently, the chamber 30 was sealed, and gases within the chamber 30 were evacuated by the rotary pump and diffusion pump which were connected with the gas outlet pipe 33. Then, a hydrogen gas was introduced into the chamber 30 through the gas inlet pipe 32 in a flow volume of 15 sccm (i.e., standard cc/min), and the gaseous pressure within the chamber 30 was adjusted to about 133 Pa. Thereafter, a direct-current voltage of 200 V was applied between the base 31 and a stainless-steel positive electrode plate 34, which was disposed inside the chamber 30, to start a discharge. Moreover, the substrates 4 were heated by ion bombardment until the temperatures of the substrates 4 were increased to 500° C. Finally, a plasma nitriding treatment was carried out at a temperature of 500° C. for 1 hour in the following manner: a nitrogen gas and a hydrogen gas were introduced into the chamber 30 through the gas inlet pipe 32 in flow volumes of 500 sccm and 40 sccm, respectively, and the gaseous pressure within the chamber 30 was adjusted to about 800 Pa; and a direct-current voltage of 400 V was applied between the base 31 and the positive electrode plate 34 by flowing a direct current of 1.5 A. Cross-sectional structures of the substrates 4, which had been subjected to the plasma nitriding treatment, were observed to found that the nitriding depth was about 30 μm on average.

After the plasma nitriding treatment, fine irregularities were formed on the surfaces of the substrates 4 (i.e., irregularities-forming treatment) as hereinafter described. A hydrogen gas and an argon gas were introduced into the chamber 30 in a flow volume of 30 sccm each, and the gaseous pressure within the chamber 30 was adjusted to about 533 Pa. Then, a direct-current voltage of 300 V was applied between the base 31 and the positive electrode plate 34 by flowing a direct current of 1.6 A, thereby subjecting the substrates 4 to sputtering at a temperature of 500° C. In the resulting irregularities, the width between the crests was 60 nm on average, and the height of the crests was 30 nm on average. Note that the irregularities-forming treatment is one of pre-treatments for improving the adhesion between a DLC—Si film and the substrate 4. Subsequently, DLC—Si films were formed on the substrates 4 in the following manner: a TMS gas and a methane gas, reaction gases, were introduced into the chamber 30 through the gas inlet pipe 32 in flow volumes set forth in Table 1 below, respectively, a hydrogen gas and an argon gas were further introduced into the chamber 30 through the gas inlet pipe 32 in a flow volume of 30 sccm each, and the gaseous pressure within the chamber 30 was adjusted to about 533 Pa; and a direct-current voltage of 320 V was applied between the base 31 and the positive electrode plate 34 by flowing a direct current of 1.8 A, thereby forming a DLC—Si film on the substrates 4 at a temperature of 500° C. Note that the film-forming time was controlled so that the resultant DLC—Si films had film thickness of from 2.5 to 3.0 μm.

In this way, three types of DLC—Si films whose Si contents differed were formed on the block-shaped test pieces. The block-shaped test pieces were labeled Example Nos. 1 through 3, respectively. Moreover, for Example No. 1 whose DLC—Si film comprised Si in the least amount, three types of DLC—Si films whose surface roughness differed were formed anew on the blank block-shaped test pieces following the above-described film-forming process.

The resulting three block-shaped test pieces were indexed Example Nos. 1-1, 1-2 and 1-3 by their surface-roughness differences.

Moreover, for comparison, a DLC film free of Si (hereinafter simply referred to as "DLC" film) was formed on the blank block-shaped test piece by a magnetron sputtering (hereinafter referred to as "MSP") method. The resultant block-shaped test piece was labeled Comparative Example No. 1. Note that three types of DLC films were formed whose surface roughness differed. The resulting three block-shaped test pieces were indexed Comparative Example Nos. 1-1, 1-2 and 1-3 by their surface-roughness differences. In addition, for further comparison, a chromium nitride (CrN) film was formed on the blank block-shaped test piece by a hollow cathode (hereinafter referred to as "HCD") method. The resultant block-shaped test piece was labeled Comparative Example No.2. Note that three types of CrN films were formed whose surface roughness differed. The resulting three block-shaped test pieces were indexed Comparative Example Nos. 2-1, 2-2 and 2-3 by their surface-roughness differences.

Table 1 below summarizes the film-forming methods, film-forming conditions, compositions and hardness of films which were formed on the block-shaped test pieces according to Example Nos. 1 through 3 and Comparative Example No. 1. Moreover, Table 2 below lists the thickness, surface roughness and adhesion forces of the films which were formed on the block-shaped test pieces according to Example Nos. 1 through 3 and Comparative Example Nos. 1 and 2. In a latter-described sliding test, the films formed on the block-shaped test pieces made sliding surfaces which contacted slidably with a mating member. Note that Comparative Example Nos. 3-1 and 3-2 listed in Table 2 were blank block-shaped test pieces made of the same SUS440C but exhibited different surface roughness from that of the block-shaped test pieces used in Example Nos. 1 through 3 and Comparative Example Nos. 1 and 2.

The silicon contents in the DLC—Si films were analyzed quantitatively by electron probe microanalysis (hereinafter referred to as "EPMA"), X-ray photoelectron spectroscopy (hereinafter referred to as "XPS"), Auger electron spectroscopy (hereinafter referred to as "AES") and Rutherford back scattering spectroscopy (hereinafter referred to as "RBS"). Moreover, the hydrogen contents in the DLC—Si films and the DLC films were analyzed quantitatively by elastic recoil detection analysis (hereinafter referred to as "ERDA"). Note that the ERDA is a method for measuring hydrogen concentrations in films in which the surfaces of films are irradiated with a 2-MeV helium ion beam to scatter hydrogen ions out of the films and the scattering hydrogen atoms are detected by a semiconductor detector.

TABLE 1

| Sample Identification | Film-forming Method | Reaction Gas (sccm) | | Film Composition (atomic %) | | | Hardness (GPa) |
|---|---|---|---|---|---|---|---|
| | | TMS | CH₄ | Si | C | H | |
| Ex. No. 1 | PCVD | 1 | 100 | 6 | 64 | 30 | 17 |
| Ex. No. 2 | PCVD | 4 | 50 | 12 | 56 | 32 | 20 |
| Ex. No. 3 | PCVD | 10 | 50 | 17 | 54 | 29 | 25 |
| Comp. Ex. No. 1 | MSP | None | None | None | 85 | 15 | 22 |

TABLE 2

| Sample Identification | Film-forming Method | Film Thickness (μm) | Surface Roughness $Rz_{jis}$ (μm) | Adhesion Force (N) |
|---|---|---|---|---|
| Ex. No. 1-1 | PCVD | 2.7 | 0.15 | 55 |
| Ex. No. 1-2 | PCVD | 2.7 | 0.45 | 50 |
| Ex. No. 1-3 | PCVD | 2.7 | 0.80 | 46 |
| Ex. No. 2 | PCVD | 2.8 | 0.15 | 50 |
| Ex. No. 3 | PCVD | 2.5 | 0.15 | 35 |
| Comp. Ex. No. 1-1 | MSP | 1.5 | 0.1 | 9 |
| Comp. Ex. No. 1-2 | MSP | 1.5 | 0.4 | 7 |
| Comp. Ex. No. 1-3 | MSP | 1.5 | 1.3 | 5 |
| Comp. Ex. No. 2-1 | HCD | 2.5 | 0.2 | >80 |
| Comp. Ex. No. 2-2 | HCD | 2.5 | 0.35 | >80 |
| Comp. Ex. No. 2-3 | HCD | 2.5 | 1.4 | >80 |
| Comp. Ex. No. 3-1 | None | None | 0.09 | Not Applicable |
| Comp. Ex. No. 3-2 | None | None | 0.8 | Not Applicable |

It is understood from Table 1 that the DLC—Si films and DLC films exhibited hardness of 15 GPa or more regardless of the silicon contents. Moreover, it is appreciated from Table 2 that the adhesion forces of the DLC—Si films and DLC films depended greatly on whether they comprised silicon or were free from silicon. In addition, the irregularities-forming treatment increased the adhesion forces of the DLC—Si films to such high values of from 35 to 55 N. On the other hand, the DLC films exhibited low adhesion forces of from 5 to 9 N, though the block-shaped test pieces used in Comparative Example Nos. 1-1 through 1-3 were subjected to the irregularities-forming treatment.

(b) First Sliding Test and Evaluation on Friction Characteristics

Figure 2:
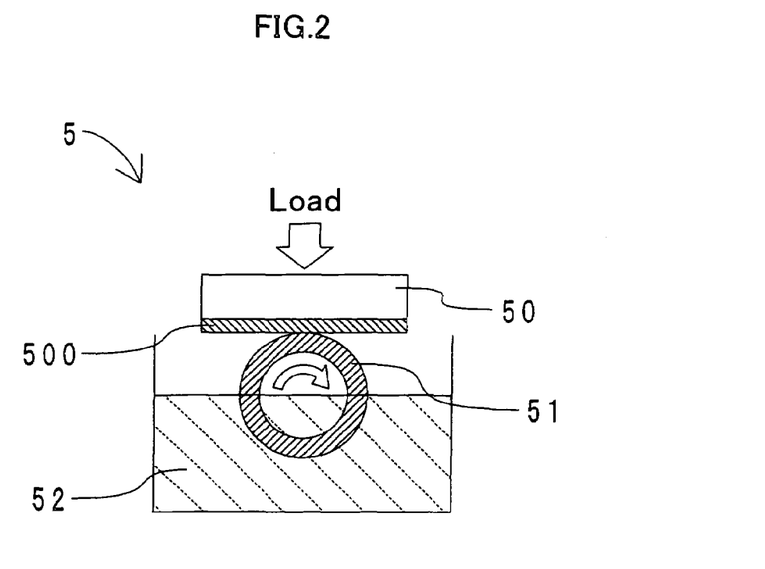
FIG. 2 is a diagram for roughly illustrating a ring-on-block type wear testing machine

The above block-shaped test pieces were subjected to a first sliding test using a ring-on-block friction testing machine "LFW-1" produced by FALEX Corp. FIG. 2 illustrates the ring-on-block friction testing machine schematically. As illustrated in the diagram, a ring-on-block friction testing machine 5 comprises a block-shaped test piece 50, and a ring-shaped test piece 51 making a mating member. The block-shaped test piece 50 and ring-shaped test piece 51 are disposed in such a manner that a film 500 formed on the block-shaped test piece 50 contacts with the ring-shaped test piece 51. The ring-shaped test piece 51 are disposed rotatably in an oil bath 52. In this sliding test, an "S-10" ring-shaped test piece, a standard test piece for the ring-on-block friction testing machine "LFW-1," was used as the ring-shaped test piece 51. Note that the "S-10" ring-shaped test piece was produced by FALEX corp., was made of carbanized SAE4620 steel, and had an outside diameter of φ 35 mm and a thickness of 8.8 mm. Moreover, two types of the "S-10" ring-shaped test pieces were prepared which exhibited surface roughness $Rz_{jis}$ of 0.5 μm and 1.3 μm, respectively. In addition, the oil bath 52 holds a gasoline engine oil, Castle Motor Oil "SL5W-30," which was heated to 80° C. and held thereat. The gasoline engine oil comprised water in an amount of 174 ppm by weight. Note that the water content was measured by a Karl Fischer's coulometric titration method, unless otherwise specified lubricants' water contents were hereinafter measured similarly.

Figure 3:
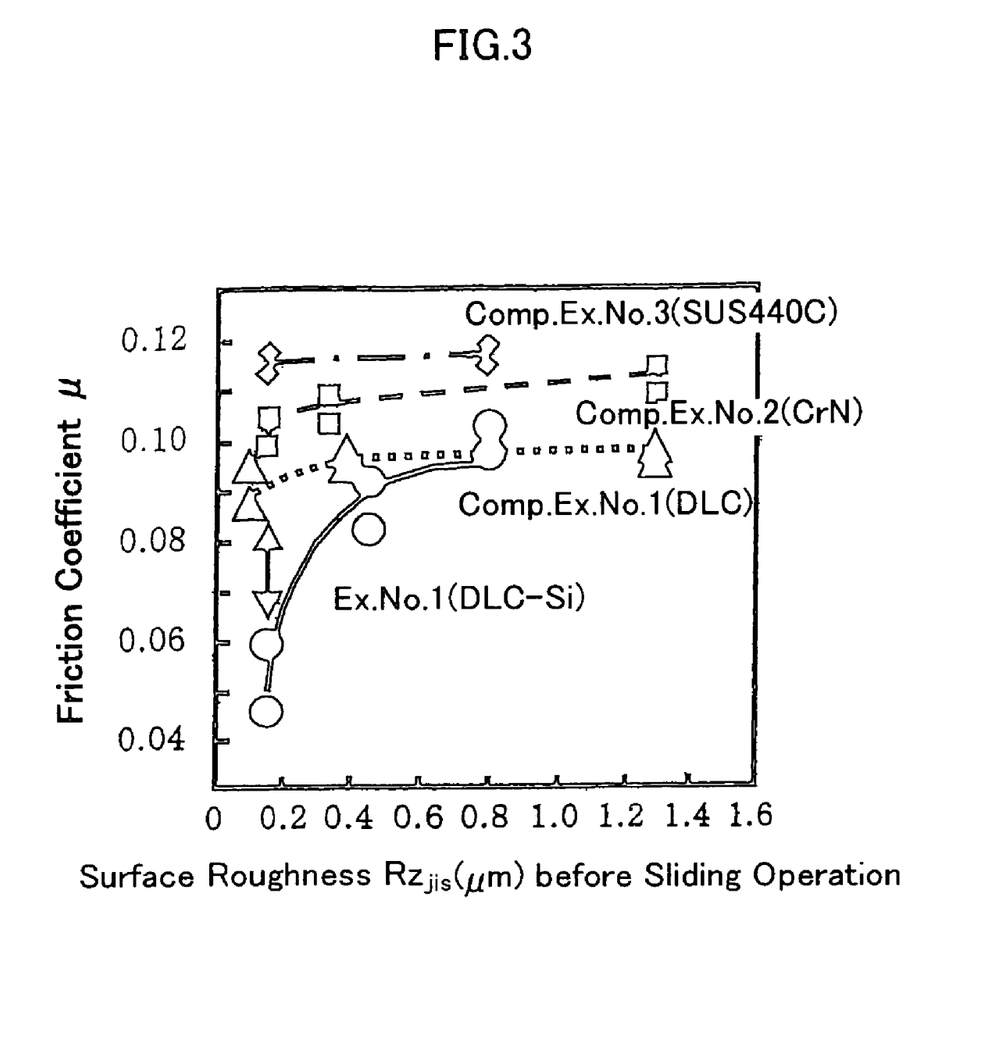
FIG. 3 is a graph for illustrating relationships between surface roughness and actual friction coefficient in a sliding operation in an engine oil, relationships which various films exhibited.

First, the ring-shaped test piece 51 was rotated without applying load thereto. Then, a load of 300 N, a Hertz pressure of 310 MPa, was applied onto the block-shaped test piece 50. Thus, the block-shaped test piece 50 and the ring-shaped test piece 51 were slid at a sliding speed of 0.3 m/s for 30 minutes. Thereafter, a friction coefficient between the block-shaped test piece 50 and the ring-shaped test piece 51 were measured. Note that the "Hertz pressure" herein means the maximum value of pressure exerted to an actual contact area into which the elastic deformation at the contact between the block-shaped test piece 50 and the ring-shaped test piece 51 is taken into account. FIG. 3 illustrates the measurement results on the friction coefficients between the block-shaped test pieces according to Example No. 1 and Comparative Example Nos. 1 through 3 and the ring-shaped test piece 51. Note that the horizontal axis of the drawing specifies the surface roughness of the sliding surfaces of the respective block-shaped test pieces before the sliding operation.

As can be seen from FIG. 3, the friction coefficients between the block-shaped test pieces according to Comparative Example Nos. 1 through 3 and the ring-shaped test piece 51 were high values regardless of the surface roughness of their sliding surfaces. On the other hand, the friction coefficients between the block-shaped test pieces according to Example No. 1, whose sliding surfaces comprised the DLC—Si film, and the ring-shaped test piece 51 lowered as their surface roughness reduced, though a high value was demonstrated when the surface roughness $Rz_{jis}$ was 0.85 µm. Note that the friction coefficient between the block-shaped test pieces according to Example No. 1 and the ring-shaped test piece 51 was 0.06 or less when the surface roughness $Rz_{jis}$ was 0.15 µm. Thus, it was found that the DLC—Si film whose surface roughness $Rz_{jis}$ is 0.8 µm or less exhibits reduced actual friction coefficients in sliding operations. Especially, the DLC—Si film whose surface roughness $Rz_{jis}$ is 0.3 µm or less is very effective for the reduction of friction coefficient.

Figure 4:
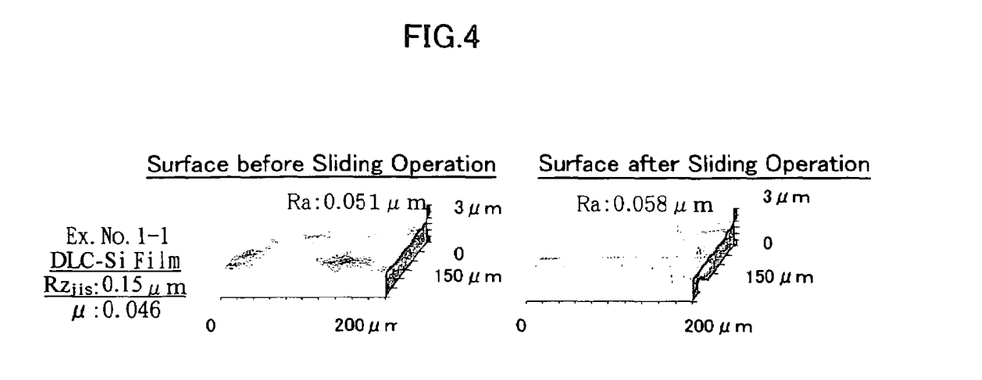
FIG. 4 is a diagram for illustrating surface roughness before and after a sliding operation, roughness which a block-shaped test piece according to Example No. 1-1 exhibited.
Figure 5:
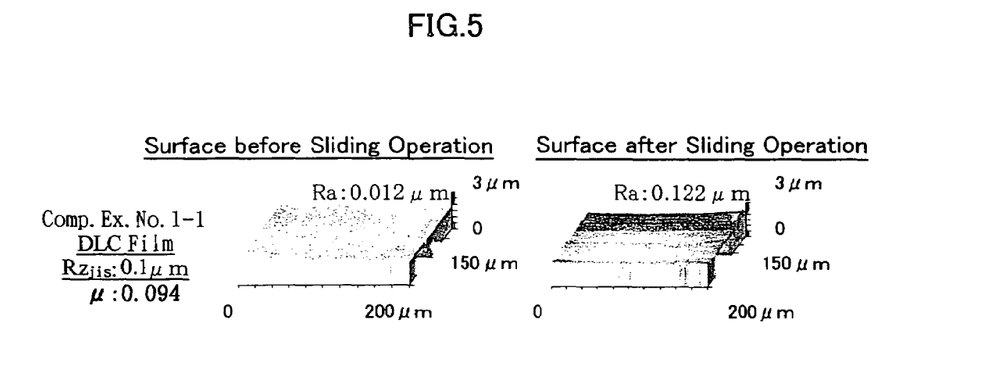
FIG. 5 is a diagram for illustrating surface roughness before and after a sliding operation, roughness which a block-shaped test piece according to Comparative Example No. 1-1 exhibited.
Figure 6:
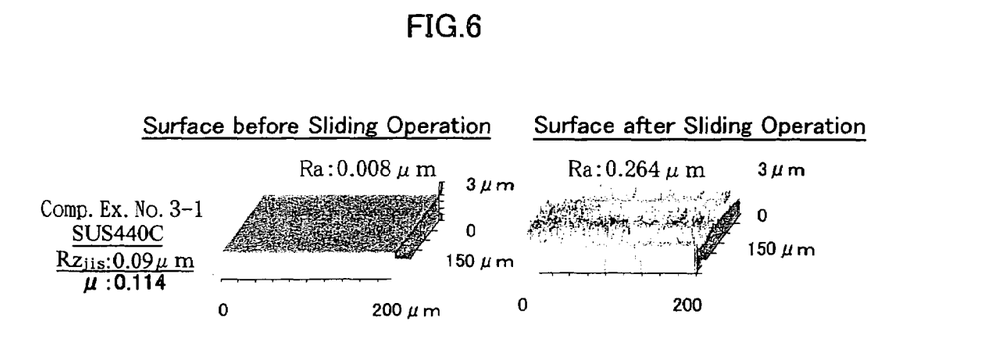
FIG. 6 is a diagram for illustrating surface roughness before and after a sliding operation, roughness which a block-shaped test piece according to Comparative Example No. 3-1 exhibited.

FIGS. 4, 5 and 6 illustrate the surface roughness of the sliding surfaces of the block-shaped test pieces according to Example No.1-1, Comparative Example No. 1-1 and Comparative Example No. 3-1 before and after the sliding operation, respectively. The surface roughness was measured by a non-contact surface profiler, "New Vision" produced by ZYGO Corp. It is appreciated from FIG. 4 that the surface roughness of the DLC—Si film formed on the block-shaped test piece according to Example No. 1-1 hardly varied before and after the sliding operation. On the contrary, as illustrated in FIG. 5, the surface roughness of the DLC film formed on the block-shaped test piece according to Comparative Example No. 1-1 increased slightly after the sliding operation. Moreover, as illustrated in FIG. 6, the surface roughness of the block-shaped test piece free from film according to Comparative Example No. 3-1 increased sharply after the sliding operation. From the measurement results, it was understood that the DLC—Si film is hard and is less likely to wear. Therefore, when the DLC—Si film exhibits a small surface roughness, it keeps exhibiting the small surface roughness during sliding operations. Accordingly, the proportion of lubrication resulting from lubricant increases. Consequently, the DLC—Si film demonstrates reduced actual friction coefficients in sliding operations.

Figure 7:
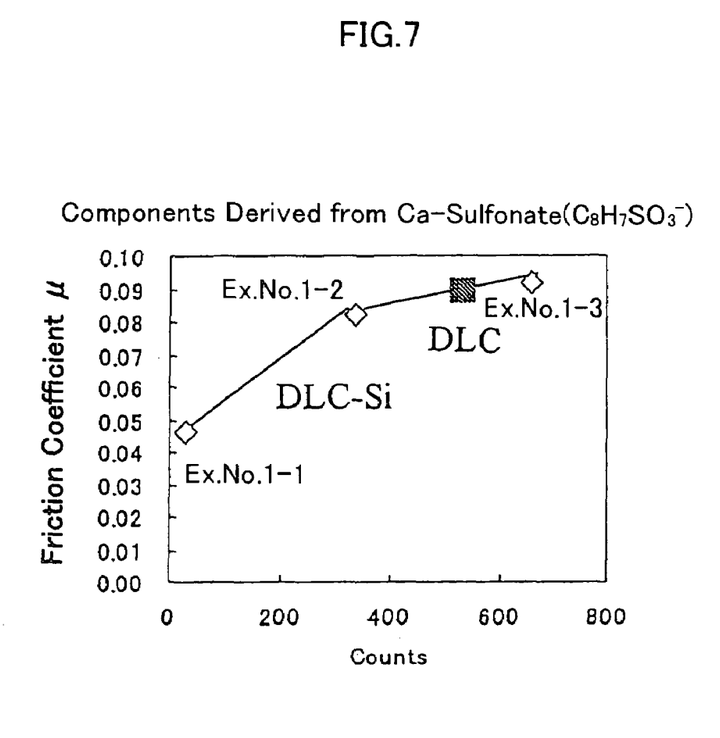
FIG. 7 is a graph for illustrating a result of analysis on absorbents onto film surfaces, namely, analysis on adsorption of components derived from Ca-Sulfonate (i.e., $C_8H_7SO_3^-$) on film surfaces.
Figure 8:
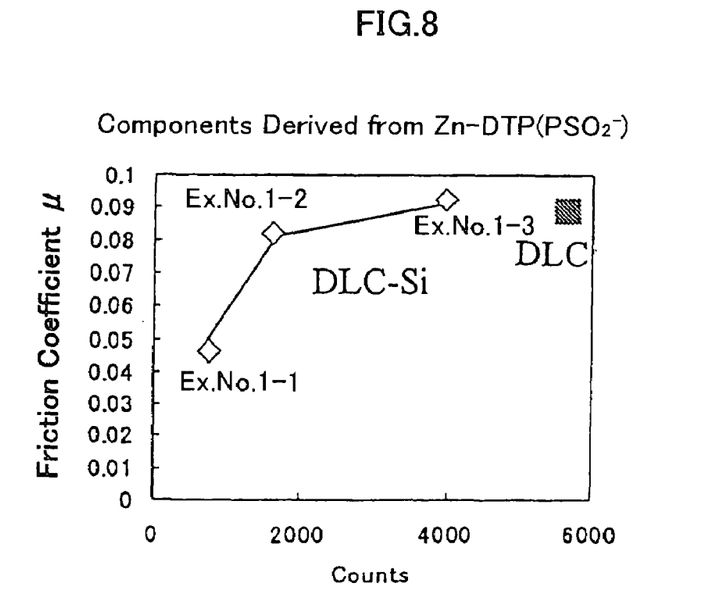
FIG. 8 is a graph for illustrating a result of analysis on absorbants onto film surfaces, namely, analysis on adsorption of components derived from Zn-DTP (i.e., $PSO_2^-$) on film surfaces.

Moreover, in order to investigate the factor for the reduction of boundary friction, the DLC—Si films formed on the block-shaped test pieces according to Example Nos. 1-1 through 1-3 and the DLC films formed on the block-shaped test piece according to Comparative Example No. 1-1 were examined for adsorbents on the surfaces of the films after the sliding operation. The adsorbents were analyzed by time-of-flight secondary ion mass spectroscopy (or TOF-SIMS). FIGS. 7 and 8 illustrate the results of the analysis on the adsorbents. FIG. 7 shows the adsorption of components derived from Ca-Sulfonate (i.e., $C_8H_7SO_3^-$). FIG. 8 shows the adsorption of components derived from Zn-DTP (i.e., $PSO_2^-$). Note that both are representative additive components for engine oils.

As can be appreciated from FIGS. 7 and 8, the smaller surface roughness the DLC—Si film exhibited, the less the adsorption was. In particular, the adsorption of both additive components was remarkably less on the DLC—Si film formed on the block-shaped test piece according to Example No. 1-1 which exhibited the minimum surface roughness, compared with the DLC film formed on the block-shaped test piece according to Comparative Example No. 1-1. In addition, the DLC—Si film formed on the block-shaped test piece according to Example No. 1-1 showed the most reduced friction coefficient between itself and the carbanized-SAE4620-steel ring-shaped test piece 51. Thus, additives included in lubricants are less likely to adsorb onto the DLC—Si film. From these facts, it is possible to say that the DLC—Si film achieves the reduction of friction coefficient not by the adsorption and reaction of additives included in lubricants thereto. According to an analysis carried out separately by the present inventors, it was found that silanol was formed on the surface of the DLC—Si film after sliding operations.

Figure 9:
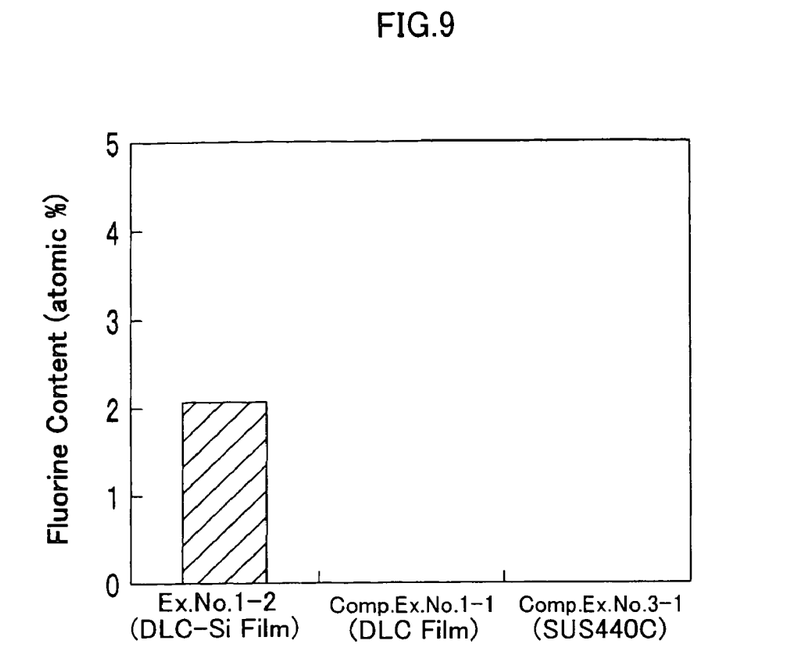
FIG. 9 is a graph for illustrating a result of analysis on silanol content on block-shaped test pieces by means of derivatization X-ray photoelectron spectroscopy (hereinafter ted to as "XPS").

The analysis on the generation of silanol was carried out by derivatization XPS. First, the block-shaped test piece provided with the DLC—Si film according to Example No. 1-2, the block-shaped test piece provided with the DLC film according to Comparative Example No. 1-1, and the SUS404C block-shaped test piece according to Comparative Example No. 3-1, which were subjected to the above-described sliding operation, were immersed into sulfuric acid for 1 hour. Note that the used sulfuric acid contained tridecafluoro-1,1,2,2-tetrahydrooctyl-dimethylchlorosilane, a reaction agent. Then, the block-shaped test pieces were washed fully with chloroform. Finally, the contents of derivatized fluorine on the block-shaped test pieces were analyzed quantitatively by XPS. Note that it is possible to estimate the silanol contents on the block-shaped test pieces based on the detected fluorine contents as indexes. FIG. 9 shows the results of the derivatization XPS.

As shown in FIG. 9, fluorine was detected on the DLC—Si film formed on the block-shaped test piece according to Example No. 1-2. Thus, it is apparent that silanol was generated on the DLC—Si film. In contrast, no fluorine was detected on the DLC film, formed on the block-shaped test piece according to Comparative Example No. 1-1, as well as on the SUS404C block-shaped test piece according to Comparative Example No. 3-1. Thus, it is believed that the silanol generated on the surface of the DLC—Si film contributes to reducing boundary friction, though additive included in lubricants adsorb onto and react with the DLC—Si film as well. Note that it is believed that the content of detected fluorine can preferably be from 1 atomic % or more, further preferably from 3 atomic % or more when substances in the part detected by XPS are taken as 100 atomic %.

Figure 10:
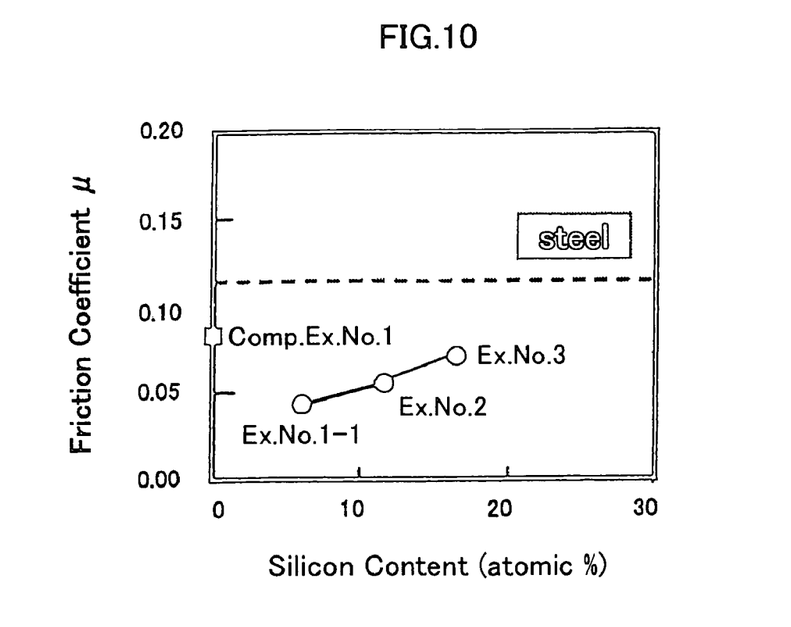
FIG. 10 is a graph for illustrating relationships between Si content in film and actual friction coefficient in a sliding operation, relationships which various films exhibited.

Moreover, FIG. 10 illustrates relationships between Si content in film and actual friction coefficient in the sliding operation. As illustrated in the drawing, all of the block-shaped test pieces according to Example No. 1-1, Example No. 2 and Example No. 3 on which the DLC—Si films were formed demonstrated lower actual friction coefficients than steel, designated with the dotted line of the drawing, and the block-shaped test piece according to Comparative Example No. 1 on which the DLC film was formed. Moreover, a tendency, the less the silicon content was the smaller the actual friction coefficient was, was observed. In addition, the respective DLC—Si films were examined for worn depths after the sliding operation. As a result, the DLC—Si film with a silicon content of 6 atomic % formed on the block-shaped test piece according to Example No. 1-1 was found to exhibit a worn depth of 0.3 μm. Moreover, the worn depth deepened as the silicon content increases. Specifically, the DLC—Si films whose silicon contents were 12 atomic % and 17 atomic % exhibited worn depths of 0.6 μm and 1.2 μm, respectively. Therefore, when taking both reduction of friction coefficient and improvement of abrasion resistance of the DLC—Si film into consideration, the silicon content can preferably fall in a range of from 5 atomic % or more to 9.8 atomic % or less when the entire DLC—Si film is taken as 100 atomic %.

(2) Sliding Test under ATF (a) Formation of DLC—Si Film

Two types of DLC—Si films whose surface roughness differed with each other were formed on block-shaped test pieces in the same manner as described in "(1) Sliding Test under Engine Oil, (a) Formation of DLC—Si Film." However, note that, in this sliding test, a block-shaped test piece made of SCM420, chromium molybdenum steel (as per JIS), was used. Except the material of the block-shaped test pieces, the film-forming method, film-forming conditions and composition were identical with those for Example No. 1 set forth in above Table 1. The resulting two block-shaped test pieces were labeled Example Nos. 1-4 and 1-5, respectively. Table 3 below lists the thickness, surface roughness and adhesion forces of the films which were formed on the block-shaped test pieces according to Example Nos. 1-4 and 1-5. Note that Comparative Example Nos. 3-3 and 3-4 listed in Table 3 were blank block-shaped test pieces made of the same SCM420 but exhibited different surface roughness from that of the block-shaped test pieces used in Example Nos. 1-4 and 1-5.

TABLE 3

| Sample Identification | Film-forming Method | Film Thickness (μm) | Surface Roughness $Rz_{jis}$ (μm) | Adhesion Force (N) |
|---|---|---|---|---|
| Ex. No. 1-4 | PCVD | 3.3 | 0.1 | 38 |
| Ex. No. 1-5 | PCVD | 3.4 | 0.5 | 33 |
| Comp. Ex. No. 3-3 | None | None | 0.5 | Not Applicable |
| Comp. Ex. No. 3-4 | None | None | 1.3 | Not Applicable |

(b) Second Sliding Test and Evaluation on Friction Characteristics

Figure 11:
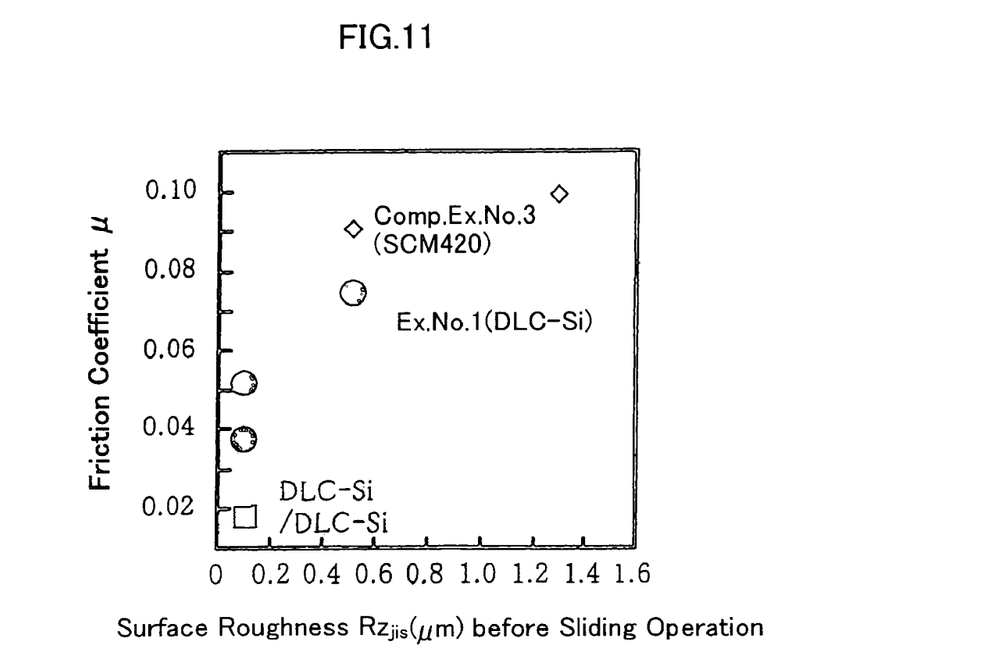
FIG. 11 is a graph for illustrating relationships between surface roughness and actual friction coefficient in a sliding operation in an automatic transmission fluid (hereinafter abbreviated to as "ATF"), relationships which various films exhibited.

The above block-shaped test pieces were subjected to a sliding test using the same ring-on-block friction testing machine (see above FIG. 2) as described in "(1) Sliding Test under Engine Oil, (b) First Sliding Test and Evaluation of Friction Characteristics." In this second sliding test, however, the oil bath 52 holds an ATF, Castle Auto Fluid Type "WS," which was heated to 80° C. and held thereat. The ATF comprised water in an amount of 150 ppm by weight. The sliding test was carried out in the following procedures. First, the ring-shaped test piece 51 was rotated without applying load thereto. Then, a load of 1,200 N, a Hertz pressure of 620 MPa, was applied onto the block-shaped test piece 50. Thus, the block-shaped test piece 50 and the ring-shaped test piece 51 were slid at a sliding speed of 0.9 m/s for 20 minutes. Thereafter, a friction coefficient between the block-shaped test piece 50 and the ring-shaped test piece 51 were measured. FIG. 11 illustrates the measurement results on the friction coefficients between the block-shaped test pieces according to Example Nos. 1-4 and 1-5 and Comparative Example Nos. 3-3 and 3-4 and the ring-shaped test piece 51. Note that the horizontal axis of the drawing specifies the surface roughness of the sliding surfaces of the respective block-shaped test pieces before the sliding operation.

It is apparent from FIG. 11 that the friction coefficients between the block-shaped test pieces 50 according to Example Nos. 1-4 and 1-5 and the SCM420 ring-shaped test piece 51 were lower than those between the block-shaped test pieces 50 according to Comparative Example Nos. 3-3 and 3-4 and the SCM420 ring-shaped test piece 51. Especially, when the block-shaped test piece 50 according to Example No. 1-4, whose DLC—Si film exhibited a surface roughness $Rz_{jis}$ of 0.1 μm, was used, the friction coefficient between the block-shaped test piece 50 and a variety of the SCM420 ring-shaped test pieces 51, whose surface roughness differed, decreased to fall in such a low range of from 0.03 to 0.05, though the friction coefficient depended slightly on the surface roughness of mating members, the SCM420 ring-shaped test pieces 51. In addition, another mating member, a ring-shaped test piece 51 covered with a DLC—Si film whose surface roughness $Rz_{jis}$ was 0.1 μm, was prepared. When sliding the block-shaped test piece 50 according to Example No. 1-4 whose DLC—Si film exhibited a surface roughness $Rz_{jis}$ of 0.1 μm on the ring-shaped test piece 51 covered with the DLC—Si film, the friction coefficient between the block-shaped test piece 50 and the ring-shaped test piece 50 was such a low value as less than 0.02, as specified by the symbol "DLC—Si/DLC—Si" of FIG. 11. Thus, when the DLC—Si film exhibited a surface roughness $Rz_{jis}$ of 0.3 μm or less, it is possible to remarkably reduce friction coefficients between the DLC—Si film and mating members in sliding operations under ATF. Moreover, when mating members are covered with the DLC—Si film, it is possible to furthermore reduce friction coefficients between the DLC—Si film and the mating members covered with the DLC—Si film.

Note that, when the block-shaped test piece 50 according to Comparative Example No. 1-1, which was prepared as described in "(1) Sliding Test under Engine Oil, (a) Formation of DLC—Si Film" and whose DLC film exerted an adhesion force of 18 N, was subjected to the second sliding test, the DLC film had come off during the second sliding test. The disadvantage results from the fact that the DLC film exhibited a low adhesion force of 18 N. As a result of the present examiners' investigation, it was confirmed that it is necessary to exert an adhesion force of 20 N or more between substrates and films in sliding operations in which a high Hertz pressure of 620 MPa or more is applied.

What is claimed is:
1. A low-friction sliding member comprising:
a substrate having a surface;
an amorphous hard carbon film on the surface of the substrate; and a silanol layer on the amorphous hard carbon film, wherein the amorphous hard carbon film comprises
  silicon in an amount of from 6 to 20 atomic %,
  hydrogen in an amount of from 25 to 35 atomic %, and
  a balance of carbon and inevitable impurities, when the entirety is taken as 100 atomic %;

the amorphous hard carbon film exhibits a surface roughness $Rz_{jis}$ of 0.5 μm or less; and the silanol layer is produced by a process comprising contacting the amorphous hard carbon film slidably with a mating member under a wet condition employing a lubricant comprising
  at least one member selected from the group consisting of phosphorus, zinc, calcium, magnesium, sodium, barium, copper and chlorine in a summed amount of 500 ppm by weight or less, and
  water in an amount of 10 ppm by weight or more.

2. The low-friction sliding member set forth in claim 1, wherein the lubricant further comprises an engine oil.

3. The low-friction sliding member set forth in claim 1, wherein:
  the lubricant further comprises an oil for driving systems; and
  the amorphous hard carbon film exhibits a surface roughness $Rz_{jis}$ of 0.3 μm or less.

4. The low-friction sliding member set forth in claim 1, wherein the amorphous hard carbon film exhibits a hardness of 15 GPa or more.

5. The low-friction sliding member set forth in claim 1, wherein an adhesion force of 20 N or more is exerted between the substrate and the amorphous hard carbon film.

6. The low-friction sliding member set forth in claim 1, wherein the mating member comprises at least one member selected from the group consisting of metal, resin and ceramic.

7. The low-friction sliding member set forth in claim 1, wherein the mating member comprises an amorphous hard carbon film comprising:
  silicon in an amount of from 1 atomic % or more to 20 atomic % or less;
  hydrogen in an amount of from 20 atomic % or more to 50 atomic % or less; and
  the balance of carbon and inevitable impurities, when the entirety is taken as 100 atomic %; and
  the amorphous hard carbon film exhibiting a surface roughness $Rz_{jis}$ of 0.8 μm or less.

8. The low-friction sliding member set forth in claim 1, wherein the lubricant comprises
  water in an amount of from 10 ppm to 5% by weight.

9. The low-friction sliding member set forth in claim 1, further comprising
  an adsorbed-water layer on the silanol layer.

* * * * *